United States Patent
Khan et al.

(10) Patent No.: US 6,919,383 B2
(45) Date of Patent: Jul. 19, 2005

(54) CO$_2$-ASSISTED DEPLOYMERIZATION, PURIFICATION AND RECYCLING OF STEP-GROWTH POLYMERS

(75) Inventors: Saad A. Khan, Cary, NC (US); George W. Roberts, Raleigh, NC (US); Joseph R. Royer, Greenville, SC (US)

(73) Assignee: North Carolina State University, Raleigh, NC (US)

( * ) Notice: Subject to any disclaimer, the term of this patent is extended or adjusted under 35 U.S.C. 154(b) by 88 days.

(21) Appl. No.: 10/119,798

(22) Filed: Apr. 10, 2002

(65) Prior Publication Data

US 2002/0169223 A1 Nov. 14, 2002

Related U.S. Application Data

(60) Provisional application No. 60/282,929, filed on Apr. 10, 2001.

(51) Int. Cl.[7] .................................................. C08J 11/04
(52) U.S. Cl. ........................... 521/40; 521/48; 521/48.5; 521/49; 521/49.5
(58) Field of Search ........................... 521/40, 48, 48.5, 521/49, 49.8

(56) References Cited

U.S. PATENT DOCUMENTS

| | | | |
|---|---|---|---|
| 3,321,510 A | | 5/1967 | Lotz et al. |
| 3,403,115 A | | 9/1968 | Gruschke et al. |
| 5,049,647 A | * | 9/1991 | Al-Ghatta .................... 528/272 |
| 5,055,167 A | * | 10/1991 | Dummersdorf et al. ..... 204/165 |
| 5,413,681 A | * | 5/1995 | Tustin et al. .................. 203/80 |
| 5,432,203 A | | 7/1995 | DeBruin et al. |
| 2004/0054238 A1 | * | 3/2004 | Ban et al. .................... 568/723 |

FOREIGN PATENT DOCUMENTS

| | | |
|---|---|---|
| CA | 2 219 217 A1 | 4/1998 |
| EP | 0 484 963 B1 | 7/1995 |
| EP | 0 662 466 B1 | 3/1997 |
| GB | 2 041 916 A | 9/1980 |

OTHER PUBLICATIONS

Paszun et al., *Chemical Recycling of Poly(ethylene terephthlate)*, Ind. Eng. Chem. Res., 1997, 36, pp. 1373–1383.

* cited by examiner

*Primary Examiner*—Katarzyna Wyrozebski
(74) *Attorney, Agent, or Firm*—Myers Bigel Sibley & Sajovec PA

(57) ABSTRACT

A method of depolymerizing a polymer comprises contacting a polymer with a fluid comprising carbon dioxide and at least one component, wherein the fluid plasticizes the polymer and facilitates penetration of the component into the polymer to depolymerize the polymer and form oligomeric units, monomeric units, or combinations thereof.

38 Claims, 2 Drawing Sheets

CO$_2$-ASSISTED DEPLOYMERIZATION, PURIFICATION AND RECYCLING OF STEP-GROWTH POLYMERS

RELATED APPLICATION

This application claims the benefit of U.S. Provisional Application No. 60/282,929, filed Apr. 10, 2001, the disclosure of which is incorporated herein by reference in its entirety.

FIELD OF THE INVENTION

The present invention relates to processing of step-growth polymers.

BACKGROUND OF THE INVENTION

There is a current emphasis on increasing the uses of recycled materials, specifically polymeric resins. As one example, poly(ethylene terephthalate) (PET) is one of the major post-consumer plastic wastes within the U.S. and around the world. According to the National Association for PET Container Resources (NAPCOR), over 771 million lbs. of post-consumer PET were recycled and sold or exported from the U.S. in 1999. However, this is believed to be only 24 percent of the total amount of PET available for recycling. While some of the challenge to increase recycling lies in the ability to collect the post-consumer products, the viability of the recycling industry, in all likelihood, ultimately depends on producing high-value products from post-consumer waste. This capability most likely does not exist at present with PET. For example, in 1999, it was estimated that 59 percent of the recycled post-consumer PET was used as fiber in applications such as sleeping bags, bedding and clothes. It is further estimated that only 9 percent was suitable for bottle-to-bottle recycling, the highest value-added product.

There are three main types of post-consumer recycling: reuse, physical reprocessing, and chemical reprocessing. Reuse of polymeric packaging materials, common for glass, is largely not acceptable for most of the currently collected, post-consumer PET. Physical reprocessing typically involves grinding, melting and reforming of the plastic packaging. During physical processing, the basic polymer molecules are typically not altered. Moreover, it may be extremely difficult, if not impossible, to remove contaminants to very low levels using physical processing. Finally, chemical reprocessing involves depolymerization of the used packaging material with subsequent regeneration and purification of the resulting monomers (or oligomers). The monomers are then repolymerized and new packaging is formed.

The Food & Drug Administration (FDA) has issued letters of "no objection" for direct food contact for several depolymerization processes. In one embodiment of an FDA-approved process, solid particles of PET are contacted with a depolymerization agent such as, for example, methanol or ethylene glycol and the starting monomers of ethylene glycol (EG) and dimethyl terephthalate (DMT) are typically recovered. It should be appreciated that other depolymerization agents can be used with other various polymers as set forth herein in greater detail. Methanolysis and glycolysis reactions are shown in Scheme 1.

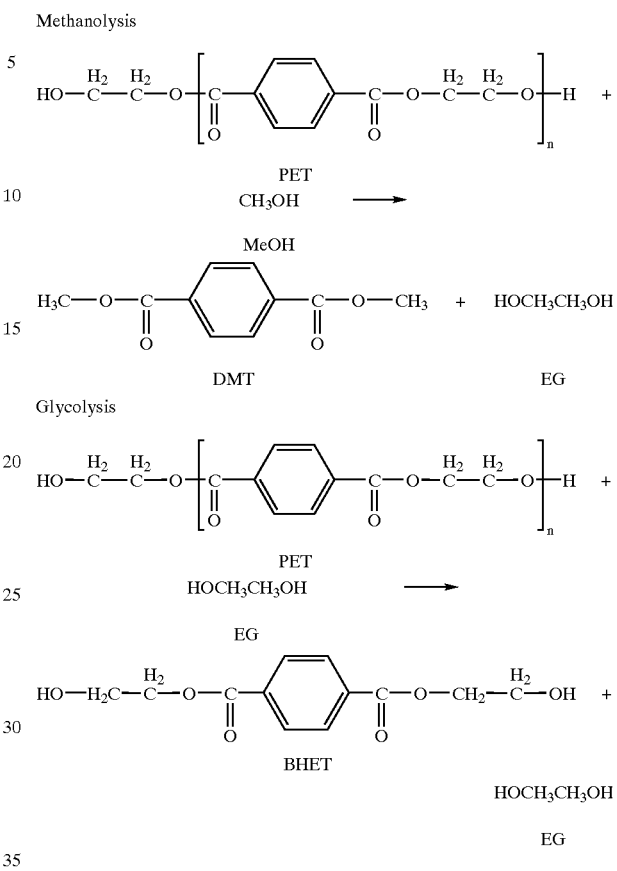

One of the main disadvantages associated with conventional depolymerization processes is that several purification steps are typically needed to obtain usable monomers. In addition to chemical depolymerization, contaminants associated with the polymers need to be removed from the monomers to very low levels. This often requires several purification steps, including washing, distillation, crystallization and additional chemical reactions. The cost of these additional cleaning steps usually dramatically increases the effective cost of the recycled monomers. In addition, long reaction times are typically required for depolymerization processes.

In order to sustain and expand the recycling industry, there is a need in the art to provide new recycling approaches that are capable of increasing the ability to recycle post-consumer step-growth polymers (e.g., PET) into bottles, other food packaging materials, or other high value-added products in a more efficient manner.

SUMMARY OF EMBODIMENTS OF THE INVENTION

According to embodiments of the present invention, a method of depolymerizing a polymer includes contacting a polymer with a fluid comprising carbon dioxide and at least one component such that the fluid plasticizes the polymer and facilitates penetration of the component into the polymer to depolymerize the polymer and form oligomeric units, monomeric units, or combinations thereof.

According to other embodiments of the present invention, a method of depolymerizing a polymer in an extruder includes introducing a solid polymer into the extruder, melting the polymer to provide a molten polymer, contacting the molten polymer with a fluid comprising carbon dioxide and at least one component in a barrel of the extruder, and removing the fluid containing the contaminant from the extruder. The fluid plasticizes the polymer and facilitates penetration of the component into the polymer to depolymerize the polymer and form oligomeric units, monomeric units, or combinations thereof.

According to still other embodiments of the present invention, a method of depolymerizing a polymer in an extruder includes introducing a solid polymer into the extruder, melting the polymer to provide a molten polymer, contacting the molten polymer with a depolymerizing fluid comprising a depolymerizing agent in a barrel of the extruder to depolymerize the polymer and form oligomeric units, monomeric units, or combinations thereof, and removing the depolymerizing fluid from the extruder.

DETAILED DESCRIPTION OF EMBODIMENTS OF THE PRESENT INVENTION

Figure 1:
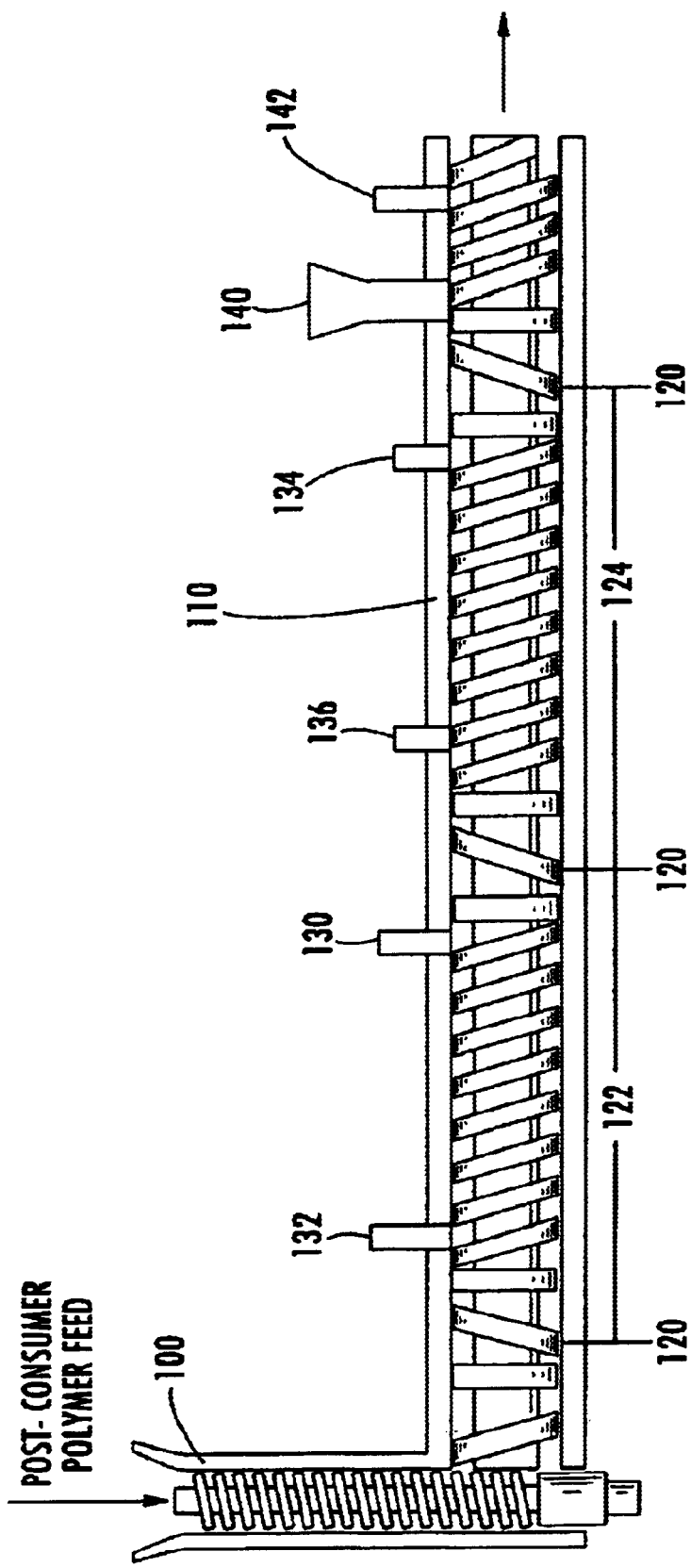
FIG. 1 illustrates a twin-screw extruder that is employed in methods of embodiments of the present invention.

The present invention will now be described by the embodiments that follow. It should be understood that these embodiments are for the purposes of illustrating the invention, and do not limit the scope of the invention as defined by the claims.

In one aspect, the invention provides a method of depolymerizing a polymer. The method comprises contacting a polymer with a fluid comprising carbon dioxide and at least one component (e.g., a depolymerization agent, as described in detail herein below). The fluid plasticizes the polymer and facilitates penetration of the component into the polymer structure to depolymerize and form oligomeric units, monomeric units, or combinations thereof. In the above method, the polymer preferably is in a molten state.

Examples of polymers that can be depolymerized include, without limitation, step-growth polymers. Exemplary step-growth polymers include, without limitation, poly(ethylene terephthalate), poly(ethylene naphthalate), poly(butylene terephthalate), poly(bis-phenol-A-carbonate), Nylon 6, Nylon 6,6, Nylon 11, polyurethane, blends thereof, and mixtures thereof. In this specific preferred embodiment, the polymer depolymerizes as it passes along the barrel of the main extruder.

In some embodiments, the carbon dioxide is supercritical carbon dioxide. Preferably, the carbon dioxide has a temperature ranging from about 31° C. to about 350° C. and a pressure ranging from about 1170 psi to about 6000 psi.

In other embodiments, the carbon dioxide is liquid carbon dioxide. Preferably, the liquid carbon dioxide has a temperature ranging from about 0° C. to about 350° C. and a pressure ranging from about 600 psi to about 1170 psi.

In still other embodiments, the carbon dioxide is gaseous carbon dioxide. Preferably, the gaseous carbon dioxide has a temperature ranging from about 0° C. to about 350° C. and a pressure ranging from about 200 psi to about 1170 psi.

Mixtures of liquid, supercritical, and gaseous carbon dioxide may be used.

Embodiments of the component that is used in the method of the invention include, without limitation, an organic depolymerization agent(s), an aqueous depolymerization agent(s), or combinations thereof. Preferably, the component is a one or more compounds that are condensation products of the polymerization process for the particular polymer to be depolymerized. Exemplary components include, without limitation, alcohols (e.g., methanol, ethanol, propanol), glycols (e.g., methylene glycol, ethylene glycol, propylene glycol), phenol, water, and mixtures thereof. The component may be present in various amounts. Preferably, the component is present in an amount ranging from about 0.5, 5, 10, or 25 to about 35, 40, 50, or 70 percent based on the weight of the fluid.

The contacting operation may be carried out in a countercurrent or cocurrent configuration, depending on the intentions of one skilled in the art.

In one embodiment, the method of the invention may optionally comprise separating at least a portion of the monomeric units from the oligomeric units, or combinations thereof, by virtue of the fluid comprising carbon dioxide contacting the monomeric units, oligomeric units, or combinations thereof.

The method according to the present invention may include additional operations. In one embodiment, the method further comprises extracting the at least one contaminant from the depolymerized oligomeric units, monomeric units, or combinations thereof by contacting the depolymerized oligomeric units, monomeric units, or combinations thereof with a second fluid mixture comprising carbon dioxide and at least one component, which may encompass, but not be limited to, those described herein. Any number of contaminants may be removed. Examples of groups of contaminants that can be removed include, without limitation, volatile nonpolar organic substances, volatile polar organic substances, nonvolatile nonpolar organic substances, nonvolatile polar organic substances, and mixtures thereof. Typically, the contaminant is an organic solvent (e.g., a cleaning solvent) or an insecticide. An exemplary list of contaminants includes, without limitation, toluene, chloroform, lindane, diazinon, disodium monomethylarsonate, ortho-cresol, and mixtures thereof. Toxic salts such as, without limitation, disodium monomethylarsonate may also be present as contaminants. Other examples of contaminants include, without limitation, acetone and trichloroethane, which may be present alone, together, or with any of the other contaminants set forth herein.

In another embodiment, the method may allow for the removal of an unreacted depolymerization agent from the oligomeric units, monomeric units, or combinations thereof by virtue of coming into contact with a fluid comprising carbon dioxide.

In another embodiment, the method further comprises separating the fluid comprising carbon dioxide and at least one component and the contaminant from the oligomeric units, monomeric units, or combinations thereof. In a preferred embodiment, the separation operation comprises venting the fluid to a low-pressure region, i.e., a region that is lower in pressure than that present during the contacting step. In one example, the low-pressure region may be at atmospheric pressure.

In yet another embodiment, the method may comprise exposing the oligomeric units, monomeric units, or combinations thereof to a second fluid comprising carbon dioxide to repolymerize the oligomeric units, monomeric units, or combinations thereof. Preferably, the exposing of the oligomeric units, monomeric units, or combinations thereof to repolymerize the oligomeric units, monomeric units, or combinations thereof comprises removing the component used in the depolymerizing operation from the first fluid comprising carbon dioxide.

In another aspect, the invention provides a method of depolymerizing a polymer in an extruder. The method comprises introducing a solid polymer into the extruder, melting the polymer to form a molten polymer, contacting the molten polymer with a fluid comprising carbon dioxide and at least one component in a barrel of the extruder, wherein the fluid plasticizes the polymer and facilitates penetration of the component into the polymer to depolymerize the polymer and form oligomeric units, monomeric units, or combinations thereof, and removing the fluid from the extruder.

The extruder may be present in various forms as will be understood by one skilled in the art. In one embodiment, for example, the extruder is a twin-screw extruder. In another embodiment, for example, the extruder is a single-screw extruder.

In one embodiment, the contacting operation that occurs in the extruder involves the molten polymer and the fluid contacting each other in a countercurrent configuration. In another embodiment, the contacting operation involves the molten polymer and the fluid contacting each other in a cocurrent configuration.

The method that encompasses employment of the extruder may encompass, without limitation, all embodiments and examples set forth herein, as well as others that may be appreciated by those skilled in the art.

In one preferred embodiment, the method provides a single-step process for selective depolymerization of a polymer to low molecular-weight oligomers, monomers, or combinations thereof and the simultaneous separation of contaminants including, without limitation, post-consumer contaminants. The method comprises contacting a polymer that comprises a contaminant with a fluid comprising carbon dioxide and at least one component. The fluid plasticizes the polymer and facilitates penetration of the component into the polymer structure to depolymerize and form oligomeric units, monomeric units, or combinations thereof. The fluid also removes the contaminant from the polymer. In embodiments that employ an extruder, the fluid comprising the contaminant is removed from the extruder.

Such contaminants may include, as an example, toluene, chloroform, lindane and diazinon and other common cleaning solvents and insecticides. The removal of these components from the initial recycled polymer feed is often difficult. Although not intending to be bound by theory, it is believed to be difficult because of the high viscosity, high-molecular weight and low diffusion rates within the polymer during the physical recycling process.

Embodiments for carrying out the methods of the invention are set forth in the figures that follow. It should be understood that other embodiments may used for carrying out these methods without departing from the spirit and scope of the invention.

In FIG. 1, the solid polymer from a feed extruder 100 enters the main twin-screw extruder 110 where the polymer is melted to provide molten polymer. The twin-screw extruder 110 has a twin-screw configuration as will be understood by those skilled in the art. The polymer may be various polymers as described above, or may be alternative polymers. Melt seals 120 in the extruder are configured to provide a depolymerization zone 122 and an extraction zone 124. A depolymerization fluid enters the depolymerization zone at port 130. The depolymerization fluid is a fluid comprising carbon dioxide (e.g., gaseous, liquid, supercritical carbon dioxide or mixtures thereof) and a component (e.g., an aqueous or organic depolymerization agent) as described above, or may be an alternative depolymerization fluid. In this specific preferred embodiment, the polymer depolymerizes as it passes along the barrel of the twin-screw extruder 110. Although not intending to be bound by theory, the carbon dioxide in the depolymerizing fluid is believed to play a dual role. It plasticizes the polymer, facilitating penetration of the component (e.g., depolymerization agent) into the polymer. In a preferred embodiment, it also extracts any organic contaminants from the polymer. A fluid comprising carbon dioxide and any of the remaining component exits the twin-screw extruder at port 132. The fluid may further comprise extracted contaminant and/or low molecular weight fractions of the depolymerized polymer. While the flow of the fluid through the depolymerization zone 122 is described as a countercurrent flow, it is to be understood that a cocurrent flow, where the fluid enters port 132 and exits at port 130, could also be used.

It may be preferable to control the amount of depolymerization that occurs in the depolymerization zone 122 so that the polymer is depolymerized to provide an oligomer having a degree of polymerization of 2, 3, 4, 5, 6, 7, 8, or 9 or so rather than depolymerizing the polymer to provide a monomer. For example, when the polymer is PET, it may be preferable to depolymerize the PET to a degree of polymerization of about 5, 6 or 7. The amount of depolymerization may be controlled by various techniques including, but not limited to, controlling the speed of the screw in the depolymerization zone, controlling the feed rate of the polymer, controlling the flow rate of the depolymerization fluid, controlling the temperature of the polymer undergoing depolymerization and/or the temperature of the depolymerization fluid, and/or controlling the concentration of the component (e.g., depolymerization agent) in the depolymerization fluid.

After the depolymerized polymer passes through the depolymerization zone 122, it enters the extraction zone 124 where some or all of the contaminants are extracted from the depolymerized polymer. As used herein, the term "decontaminated" refers to a material in which some or all of the contaminants have been removed from the material. The contaminants may be similar to the contaminants described above or may be alternative contaminants. An extraction fluid enters the extraction zone 124 through a port 134. The extraction fluid preferably comprises carbon dioxide (e.g., gaseous, liquid, supercritical carbon dioxide or mixtures thereof); however, it is to be understood that various other extraction fluids may be employed. The extraction fluid contacts the depolymerized polymer in the extraction zone and exits the twin-screw extruder through a port 136.

While the flow of the fluid through the extraction zone 124 is described as a countercurrent flow, it is to be understood that a cocurrent flow, where the fluid enters port 136 and exits at port 134, could also be used. The amount of extraction achieved in the extraction zone 124 may be controlled by various techniques including, but not limited to, controlling the speed of the screw in the extraction zone, controlling the flow rate of the extraction fluid, and/or selecting the composition of the extraction fluid. While extraction of contaminants from the depolymerized polymer occurs in the extraction zone 124, it is to be understood that a certain amount of repolymerization of the depolymerized polymer may occur in the extraction zone 124.

While the extraction zone 124 is described as being downstream from the depolymerization zone 122, it is to be understood that the extraction zone could be upstream from the depolymerization zone. It may be preferable to configure the extraction zone to be downstream of the depolymerization zone when the polymer contains difficult to remove contaminants such as, but not limited to, coloring agents.

After the depolymerized and decontaminated polymer leaves the extraction zone 124, it enters a vent stuffer 140. The vent stuffer 140 is preferably a single- or twin-screw extruder configured to separate molten depolymerized polymer from the supercritical, liquid or gas phase, or mixtures thereof, and return the depolymerized polymer to the twin-screw extruder 110. After the depolymerized and decontaminated polymer is processed by the vent stuffer 140 it passes by a vacuum vent 142, which withdraws most if not all of the remaining volatile and non-volatile gases from the twin-screw extruder 110. For example, the carbon dioxide containing dissolved contaminants, along with, as an example, ethylene glycol and unreacted methanol, may be removed by the vacuum vent 142 of the twin-screw extruder 110.

The depolymerized and decontaminated polymer can then undergo various other processes including, but not limited to, exiting the twin-screw extruder 110 through a die.

With respect to the embodiment set forth in FIG. 1, the potential advantages of the extrusion-based process are: 1) elimination of the solvents and processing steps that are required for separation of oligomeric and monomeric components from the contaminants; and 2) much higher depolymerization rates due to the presence of a plasticized, molten polymer.

Figure 2:
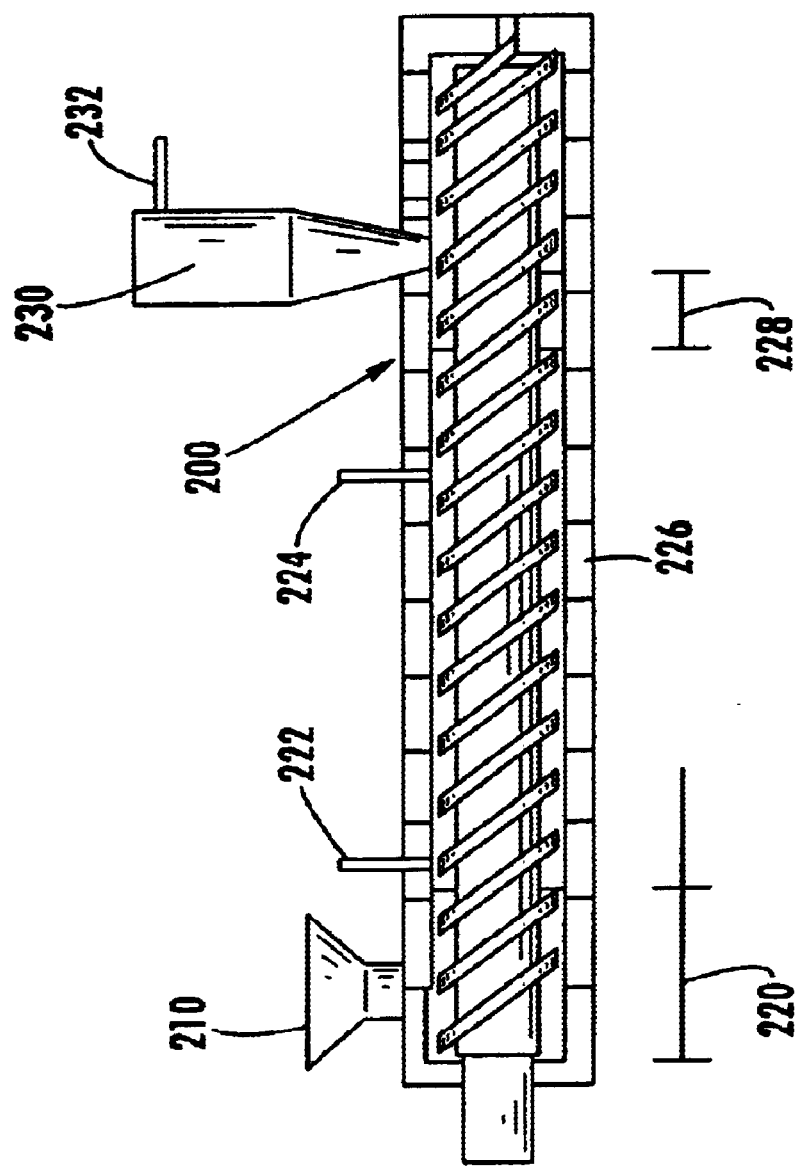
FIG. 2 illustrates a single-screw extruder that is employed in methods of embodiments of the present invention.

A single-screw extruder 200 may be used for carrying out the method of the invention, and is set forth in FIG. 2. The single-screw extruder 200 has a single screw configuration as will be understood by those skilled in the art. In this embodiment, polymer is introduced through a hopper 210 and is subsequently melted in the polymer melting zone 220 of the extruder 200. The polymer is then transported to the main barrel 226 of the extruder 200 where it comes into contact with a depolymerization fluid. The depolymerization fluid enters the extruder 200 through inlet port 222 and exits the extruder 200 through outlet port 224. The depolymerization fluid is a fluid comprising carbon dioxide (e.g., gaseous, liquid, supercritical carbon dioxide or mixtures thereof) and a component (e.g., an aqueous or organic depolymerization agent) as described above, or may be an alternative depolymerization fluid. When the main barrel 226 of the extruder 200 is substantially filled with molten polymer, the contact between the polymer and the depolymerizing fluid preferably occurs in a cocurrent configuration as described. If the main barrel 226 of the extruder 200 is partially filled with molten polymer, the contact between the polymer and fluid may be in a cocurrent configuration as described, or may be in a countercurrent configuration in which the depolymerization fluid enters through the port 224 and exits through the port 222. During this contact with the depolymerization fluid, the polymer depolymerizes into oligomeric units, monomeric units, or combinations thereof. After leaving the main barrel 226, the depolymerized polymer passes through a melt seal zone 228. The fluid used to depolymerize the polymer is then expelled through an outlet port 232 of a vent stuffer 230 and the oligomeric units, monomeric units, or combinations thereof are forwarded back to the extruder 200. Contamination and repolymerization techniques alluded to herein may then be carried out, if so desired.

This single-step, extrusion-based recycling system set forth in the embodiments of the figures may be carried out under a wide variety of processing conditions. A preferred temperature in the extruder may range from about 100° C. to about 350° C. The condensate molecule and condensate/polymer ratio may be varied according to the intentions of one skilled in the art. Additionally, one may vary the pressure, temperature, $CO_2$/polymer concentration, and average residence time in the extruder as deemed desirable.

Various process parameters may be measured as will be understood by those skilled in the art. These process parameters may then be used to control the process if desired, as will be understood by skilled artisans. As one example, one may use gel permeation chromatography (GPC) to measure molecular weight distributions of the virgin and depolymerized samples. The ability to selectively depolymerize the polymer to a desired target molecular weight distribution has the ability to enhance the control of the separation process. One may measure concentrations of contaminants, methanol, and ethylene glycol using online gas chromatography. Intrinsic viscosity or other measurements of molecular weight may also be used to measure physical properties of the virgin and depolymerized samples. Measurement of depolymerization agent concentrations may allow the molecular weights measured by GPC to be confirmed.

The foregoing is illustrative of the present invention, and is not to be construed as limiting thereof. The invention is defined by the following claims, with equivalents of the claims to be included therein.

That which is claimed:

1. A method of depolymerizing a polymer comprising contacting a polymer with a fluid comprising carbon dioxide and at least one component such that the fluid plasticizes the polymer and facilitates penetration of the component into the polymer to depolymerize the polymer and form oligomeric units, monomeric units, or combinations thereof;
   and wherein said carbon dioxide has a temperature ranging from about 0° C. to about 350° C.

2. The method according to claim 1, wherein the carbon dioxide is supercritical carbon dioxide having a temperature ranging from about 31° C. to about 350° C. and a pressure ranging from about 1170 psi to about 6000 psi.

3. The method according to claim 1, wherein the carbon dioxide is liquid carbon dioxide having a temperature ranging from about 0° C. to about 350° C. and a pressure ranging from about 600 psi to about 1170 psi.

4. The method according to claim 1, wherein the carbon dioxide is gaseous carbon dioxide having a temperature ranging from about 0° C. to about 350° C. and a pressure ranging from about 200 psi to about 1170 psi.

5. The method according to claim 1, wherein the polymer is a step-growth polymer.

6. The method according to claim 1, wherein the polymer is selected from the group consisting of poly(ethylene terephthalate), poly(ethylene naphthalate), poly(butylene terephthalate), poly(bis-phenol-A-carbonate), Nylon 6, Nylon 6,6, Nylon 11, polyurethane, and mixtures thereof.

7. The method according to claim 1, wherein the polymer includes at least one contaminant.

8. The method according to claim 7, further comprising contacting the depolymerized oligomeric units, monomeric units, or combinations thereof with a fluid mixture comprising carbon dioxide to extract the at least one contaminant from the depolymerized oligomeric units, monomeric units, or combinations.

9. The method according to claim 7, wherein the at least one contaminant is an organic cleaning solvent or insecticide.

10. The method according to claim 7, wherein the at least one contaminant is selected from the group consisting of toluene, chloroform, lindane, diazinon, disodium monomethylarsonate, ortho-cresol, and mixtures thereof.

11. The method according to claim 1, wherein the component is selected from the group consisting of methanol, ethanol, propanol, methylene glycol, ethylene glycol, propylene glycol, phenol, water, and mixtures thereof.

12. The method according to claim 11, wherein the component is present in the fluid in an amount ranging from about 0.5 to about 50.0 percent based on the weight of the fluid.

13. The method according to claim 1, wherein the contacting of the polymer with the fluid comprises contacting the fluid and the polymer in a countercurrent configuration.

14. The method according to claim 1, wherein the contacting of the polymer with the fluid comprises contacting the fluid and the polymer in a cocurrent configuration.

15. The method according to claim 7, further comprising separating the fluid comprising carbon dioxide and at least one component and the at least one contaminant from the oligomeric units, monomeric units, or combinations thereof.

16. The method according to claim 15, wherein the separating of the fluid comprising carbon dioxide and at least one component and the at least one contaminant from the oligomeric units, monomeric units, or combinations thereof comprises venting the fluid and the at least one contaminant to a low pressure region.

17. The method according to claim 15, further comprising exposing the oligomeric units, monomeric units, or combinations thereof to a second fluid comprising carbon dioxide to repolymerize the oligomeric units, monomeric units, or combinations thereof.

18. The method according to claim 17, wherein the exposing of the oligomeric units, monomeric units, or combinations thereof to a second fluid comprising carbon dioxide comprises removing the component from the first fluid comprising carbon dioxide.

19. The method according to claim 1, wherein the polymer to be depolymerized is in the molten state.

20. A method of depolymerizing a polymer in an extruder, said method comprising:
   introducing a solid polymer into the extruder;
   melting the polymer to provide a molten polymer,
   contacting the molten polymer with a fluid comprising carbon dioxide and at least one component in a barrel of the extruder, wherein the fluid plasticizes the polymer and facilitates penetration of the component into the polymer to depolymerize the polymer and form oligomeric units, monomeric units, or combinations thereof; and
   removing the fluid from the extruder;
   and wherein said carbon dioxide has a temperature ranging from about 0° C. to about 350° C.

21. The method according to claim 20, wherein the extruder is a twin-screw extruder.

22. The method according to claim 20, wherein the extruder is a single-screw extruder.

23. The method according to claim 20, wherein the contacting of the molten polymer with a fluid comprises contacting the molten polymer with the fluid in a countercurrent configuration.

24. The method according to claim 20, wherein the contacting of the molten polymer with a fluid comprises contacting the molten polymer with the fluid in a cocurrent configuration.

25. The method according to claim 20, further comprising exposing the oligomeric units, monomeric units, or combinations thereof to a second fluid comprising carbon dioxide to repolymerize the oligomeric units, monomeric units, or combinations thereof.

26. The method according to claim 25, wherein the exposing of the oligomeric units, monomeric units or combinations thereof to a second fluid comprises removing the at least one component from the first fluid comprising carbon dioxide.

27. The method according to claim 20, wherein the carbon dioxide is supercritical carbon dioxide having a temperature ranging from about 31 ° C. to about 350° C. and a pressure ranging from about 1170 psi to about 6000 psi.

28. The method according to claim 20, wherein the carbon dioxide is liquid carbon dioxide having a temperature ranging from about 0° C. to about 350° C. and a pressure ranging from about 600 psi to about 1170 psi.

29. The method according to claim 20, wherein the carbon dioxide is gaseous carbon dioxide having a temperature ranging from about 0° C. to about 350° C. and a pressure ranging from about 200 psi to about 1170 psi.

30. The method according to claim 20, wherein the polymer is a step-growth polymer.

31. The method according to claim 20, wherein the polymer is selected from the group consisting of poly(ethylene terephthalate), poly(ethylene naphthalate), poly(butylene terephthalate), poly(bis-phenol-A-carbonate), Nylon 6, Nylon 6,6, Nylon 11, polyurethane, and mixtures thereof.

32. The method according to claim 20, wherein the polymer comprises a contaminant.

33. The method according to claim 32, wherein the contacting of the molten polymer with the fluid removes the contaminant from the polymer.

34. The method according to claim 33, wherein the removing of the fluid from the extruder comprises removing the fluid comprising the contaminant from the extruder.

35. The method according to claim 32, wherein the contaminant is an organic cleaning solvent or insecticide.

36. The method according to claim 32, wherein the contaminant is selected from the group consisting of toluene, chloroform, lindane, diazinon, disodium monomethylarsonate, ortho-cresol, and mixtures thereof.

37. The method according to claim 20, wherein the component is selected from the group consisting of methanol, ethanol, propanol, methylene glycol, ethylene glycol, propylene glycol, phenol, water, and mixtures thereof.

38. The method according to claim 20, wherein the component is present in the fluid in an amount ranging from about 0.5 to about 50.0 percent based on the weight of the fluid.

* * * * *